Sept. 27, 1960  W. BEGELL  2,953,985
ACCESSORY FOR COFFEE PERCOLATORS
Filed Jan. 2, 1959

INVENTOR.
WILLIAM BEGELL
BY
　　Stephen Baker
　　　ATTORNEY

United States Patent Office 2,953,985
Patented Sept. 27, 1960

2,953,985

ACCESSORY FOR COFFEE PERCOLATORS

William Begell, 209—03 32nd Ave., Bayside, N.Y.

Filed Jan. 2, 1959, Ser. No. 784,552

1 Claim. (Cl. 99—289)

This invention relates to an accessory for coffee percolators and more particularly to a device designed to facilitate and guide the pouring of the coffee into the conventional basket therefor.

As is well known, a coffee percolator comprises a water container, a central vertical tube which delivers perking liquid to the coffee, an upper basket into which is poured the coffee so as to be subjected to the perking liquid, and a top cover. The basket is removable and is generally supported by an annular flange or boss formed on the vertical tube.

The top of the vertical tube is open so that the liquid may pour therefrom onto the coffee. In adition, in order to facilitate removal of the basket, it is supported loosely or slightly spaced from the inner walls of the container. As a consequence open spaces are created where coffee might be accidentally poured so that it reaches the liquid in the container instead of being disposed wholly in the basket. The finished coffee infusion will then contain coffee grounds which is undesirable.

The device of this invention prevents such accidental diversion of the coffee by effectively covering the above mentioned spaces.

Figure 1:
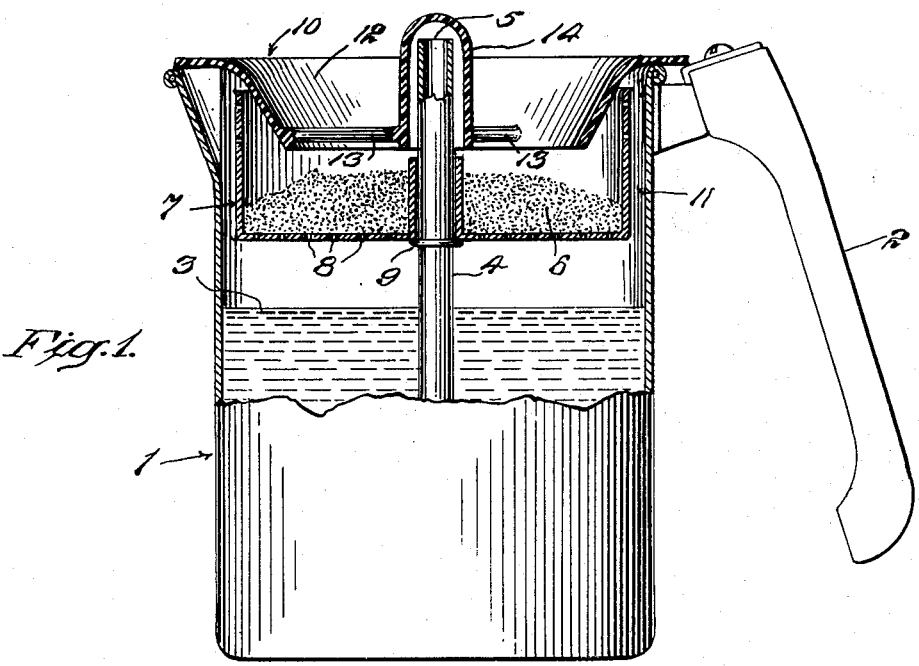
Figure 2:
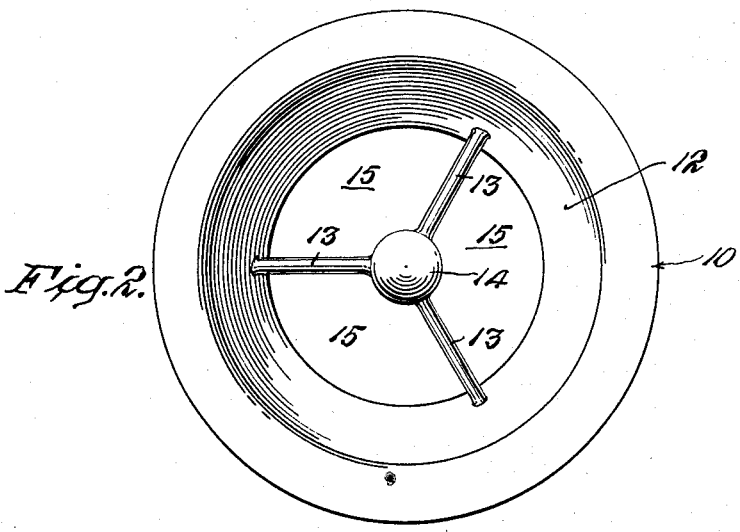

The invention will be further understood from the following description and drawings in which:

Figure 1 is a vertical cross-sectional view of the percolator with the cover, and top strainer, both not shown, removed for pouring of the ground, fresh coffee into the basket and showing the device of this invention applied over the basket; and Figure 2 is a top plan view thereof.

The container 1 has a handle 2 as is usual. The container is filled to a predetermined level with water 3. Vertical tube 4 is supported centrally of the container and serves to deliver perking water through its top open end 5 so as to spray and steep the ground coffee 6 in basket 7 whereby the water is strained through openings 8 of basket 7 so as to produce the desired infusion. Basket 7 is loosely supported by annular boss or flange 9 formed on tube 4.

As one of the first steps in the above process, basket 7 is loaded with fresh ground coffee by pouring such coffee directly therein. However, it will be observed that in the absence of guide device 10 which comprises this invention, such poured fresh ground coffee may fall into the open mouth or end 5 of tube 4, or through annular space 11 between the outer wall of basket 7 and the top inner wall of container 1. In either case, such poured coffee grounds will fall into the water 3 and will be present in the finished coffee infusion.

The guide device 10 prevents the above mis-application of the freshly poured coffee into basket 7. Device 10 comprises an annular, concavo-convex rim 12, connecting arms 13 and a central, hollow dome 14 connected to rim 12 by the arms 13. Rim 12 has a downwardly inclined upper surface and spaces 15 are formed between the arms.

Device 10 may be formed of metal or plastic or the like. It is used only when the fresh, ground coffee is poured into the basket 7 and is thereafter removed. Its rim 12 effectively covers the space 11 as observed in Figure 1. Its dome 14 also effectively covers or shields open mouth 5. The fresh, ground coffee is simply poured through spaces 15. The inclined wall or rim 12 further guides such poured coffee through the spaces 15 into the basket 7. After the basket has been sufficiently loaded, the device 10 is removed and the usual top strainer and cover, both not shown herein, are applied and the container is heated over a stove or by electricity to produce the finished coffee.

The device described herein has a number of advantageous features. For example, it saves coffee by avoiding waste. It further avoids clogging of the vertical tube or pump 4, which sometimes results in breakage of the tube. It will be understood that percolators of the type described herein may be formed of glass as well as of metal and it is therefore important to decrease the risk of such breakage.

Although I have stated the device may be made of metal or plastic, it will be understood that it may also be formed of paper or cardboard or the like. Its concentric nature assures that it will fit substantially any percolator now known.

It will also be understood that even if the basket 7 were to be loaded apart from or outside of the container, the device may still be used in order to guide the coffee toward the floor of the basket and avoiding undesired spilling of the coffee.

There has been shown what is now considered a preferred embodiment of the invention but it is obvious that changes and omissions may be made without departing from its spirit.

What is claimed is:

A guide device for loading a percolator basket with ground coffee wherein the top open mouth of a central vertical tube is disposed above the basket floor, said device comprising an outer, annular rim which is concavo-convex with the upper surface thereof being inclined downwardly, a central, hollow dome having a closed top and an open bottom for shielding the top open mouth of the percolator central vertical tube, and spaced arms connecting said dome to said rim, the spacing between the arms forming openings to permit coffee to be poured therethrough into the basket, said last named openings surrounding said dome and terminating inwardly at said dome.

References Cited in the file of this patent

UNITED STATES PATENTS

| | | |
|---|---|---|
| 102,050 | Scantlin | Apr. 19, 1870 |
| 226,465 | Veronee | Apr. 13, 1880 |
| 1,183,721 | Bowman | May 16, 1916 |
| 1,471,752 | Rieckmann | Oct. 23, 1923 |
| 1,527,934 | Stalder | Feb. 24, 1925 |
| 1,787,394 | Russell | Dec. 30, 1930 |
| 1,896,230 | Farago | Feb. 7, 1933 |
| 2,250,910 | Hiett | July 29, 1941 |
| 2,752,082 | Nergaard | June 26, 1956 |